G. W. GWINN.
MACHINE FOR WEIGHING AND PACKAGING MATERIALS.
APPLICATION FILED JULY 22, 1909.

1,020,693.

Patented Mar. 19, 1912.

G. W. GWINN.
MACHINE FOR WEIGHING AND PACKAGING MATERIALS.
APPLICATION FILED JULY 22, 1909.

1,020,693.

Patented Mar. 19, 1912.
5 SHEETS—SHEET 3.

WITNESSES

INVENTOR:
George W. Gwinn
by Dodge and Sons
Attorneys

G. W. GWINN.
MACHINE FOR WEIGHING AND PACKAGING MATERIALS.
APPLICATION FILED JULY 22, 1909.

1,020,693.

Patented Mar. 19, 1912.
5 SHEETS—SHEET 4.

WITNESSES

INVENTOR:
George W. Gwinn
by Dodge and Sons
Attorney

G. W. GWINN.
MACHINE FOR WEIGHING AND PACKAGING MATERIALS.
APPLICATION FILED JULY 22, 1909.

1,020,693.

Patented Mar. 19, 1912.

UNITED STATES PATENT OFFICE.

GEORGE W. GWINN, OF NEW YORK, N. Y., ASSIGNOR TO AUTOMATIC PACKING & LABEL-
ING COMPANY, OF DURHAM, NORTH CAROLINA, A CORPORATION OF NORTH CARO-
LINA.

MACHINE FOR WEIGHING AND PACKAGING MATERIALS.

1,020,693.  Specification of Letters Patent.  Patented Mar. 19, 1912.

Application filed July 22, 1909. Serial No. 509,052.

*To all whom it may concern:*

Be it known that I, GEORGE W. GWINN, a citizen of the United States, residing at New York, in the county of New York and State of New York, have invented certain new and useful Improvements in Machines for Weighing and Packaging Materials, of which the following is a specification.

My present invention pertains to improvements in machines for weighing and packaging materials, and has reference more particularly to the provision of means whereby the placing of a revenue stamp, label or the like over the package is prevented should the package not contain a full charge of material.

In automatic packaging mechanisms in which scale-pans are employed to weigh the charge, it sometimes happens, owing to improper functioning of the parts, that a pan does not receive a full charge and consequently the package into which said pan discharges will be what is known as a light-weight package. The placing of a revenue stamp upon such a package is, of course, a loss.

The main object of the invention is to provide means whereby when the scale-pan receives a charge which is below the minimum it will, through certain connections, prevent the placing of a stamp upon the package in which said short weight has been placed.

The invention is illustrated in connection with a machine of the same general type as that shown in my copending application filed on or about the 8th day of July 1909, Serial No. 506,579, in which a plurality of scale-pans move beneath a hopper and are successively discharged into suitable bag-holders located upon a member beneath the scale-pans and from which member the filled bags are removed into a turret carrying a series of bag-forms. The bags, after being deposited in the forms, have their upstanding ends infolded and thereafter a stamp is placed across said closed end and applied thereto. It is conceivable, however, that the invention may be applied to any type or form of machine wherein the coaction between the pan or weighing mechanism and the stamp-presenting mechanism may be effected to accomplish the objects above set forth.

In the drawings, 1 denotes the bed upon which the mechanism is supported; 2 a shaft extending upwardly therethrough, adapted to be rotated and moved endwise at intervals. Said shaft has secured to it a casting 3, provided with a series of downwardly-extending arms 4, in each of which is mounted a shaft 5, said shaft carrying at its inner end an arm 6 provided with a roller 7 which works in the groove of a fixed cam 8 which, as shaft 2 is rotated, oscillates the shafts 5 through a quarter revolution. To the outer end of each of the shafts 5 is secured a bag-holder 9 upon which the bags are placed by an attendant as the holders are brought to a horizontal position, or to the position shown at the right in Fig. 1. This mechanism forms a part of the application aforesaid, and is not claimed herein.

A post or column 10 extends upwardly from the bed 1 and has secured to it a plurality of brackets 11 which support the feed-hopper 12. The upper end of the column is reduced and forms a bearing for the hub 13 of a rotatable member 14 which supports the feed rolls, the scale-pans and the attendant mechanism. In the machine shown a plurality of scale-pans is employed, together with a plurality of feed-rolls, one for each pan. A description of one will, therefore, suffice inasmuch as they are all alike in form.

The lower edge of the hopper 12 is provided with a circular rack 15, with which meshes a gear 16, which gear is designed to impart rotary motion to a shaft 17 upon which the feed-roll 18 is mounted through frictional driving means designated by 19. Said means is specifically set forth and claimed in my copending application Serial No. 506,580, filed on the 8th day of July, 1909. It will suffice to say that the gear 16 is rotated continuously, inasmuch as the casting or member 14 which supports the same is rotated through a worm-rack 20, with which meshes a worm 21 to which continuous motion is imparted from any suitable source. The friction device carries a toothed wheel 22 which is fast to the shaft 17 upon which the feed-roll 18 is secured. Consequently, when said toothed wheel 22 is arrested the movement of the feed-roll will be arrested, and the further feeding of material through a chute 23 to the scale-pan 24 is prevented. The pan 24 is pivotally mounted between a pair of arms 25, formed as a part of the scale-beam, suitable adjusting weights 26 being mounted upon the opposite end of the beam to counterbalance the pan and the exact charge which it is desired shall pass into the package.

The support for the scale-beam is furnished by laterally-projecting arms 27, 28 which extend outwardly from a downwardly-projecting post 29 formed as an integral portion of the rotatable member 14. Said post 29 has pivotally attached to its lower end a lever 30 which extends outwardly and coacts with the arms 31, 32 secured to the doors or bottoms 33, 34 of the scale-pans, said doors being normally held in their closed position by springs 35. A rod or plunger 36 coacts with the lever 30 to open the doors when the pans reach a point over the funnel 37 through which the material passes into one of the bags below. Said rod or plunger 36 is operated by a suitable cam 38, secured to the hopper 12, a roller 39 carried by the upper end of the rod coacting with the cam.

Extending upwardly from the rotatable member 14 is a post 40, having fulcrumed upon its upper end a lever 41, to one arm of which is pivotally connected a rod 42 that extends downwardly and is connected to one of the arms 25 of the scale-beam.

Figure 5:
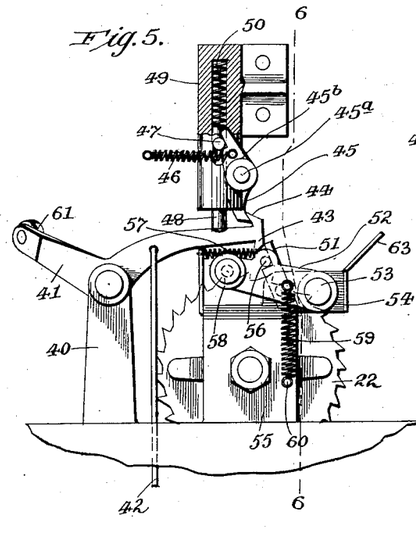
Fig. 5 an enlarged sectional elevation of the trip mechanism employed to arrest the movement of the feed-rolls and also to arrest the movement of the stamp-presenting device.
Figure 6:
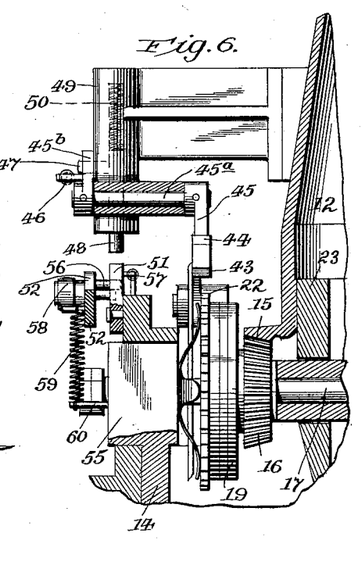
Fig. 6 a vertical sectional view, taken on the line 6—6 of Fig. 5.
Figure 7:
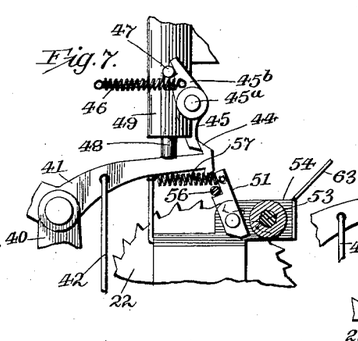
Fig. 7 a detail sectional elevation of the trip mechanism shown in Fig. 5.

When the pan is depressed, said rod 42 will be drawn downwardly and thereby rock the lever 41, turning the detent 43 formed upon one end of the arm or lever into engagement with the wheel 22, thereby arresting the movement of the feed-roll and preventing the further descent of material into the scale-pan. This mechanism is specific and forms no part of the present invention, the same being claimed in the application last mentioned. The lever 41 is provided with a second detent 44 adapted (in case said lever is not depressed through the action of the rod 42, or in other words, not depressed by reason of the fact that the scale-pan contains less than the minimum charge of material) to come into contact with a latch comprising an arm 45 secured to one end of a shaft $45^a$, which at its opposite end carries an arm $45^b$, the upper end of which is notched and normally drawn by a spring 46 under a pin 47 secured to a plunger 48 carried by a bracket or casting 49 mounted upon the hopper 12. The plunger 48 will be forced downwardly by a spring 50, and comes into the path of the upper end of a latch 51, which latch serves normally to hold a swinging block 52 in its elevated position, or that shown in Fig. 5. Said block is fulcrumed upon a pin 53 extending outwardly from an extension 54 formed upon or secured to an upward projection or column 55 formed as an integral portion of the rotatable member 14. Block 52 carries a pin 56 adapted to coact with the latch 51, which latter is thrown to the left or toward the pin by a spring 57. The block or swinging member 52 carries at its outer end a roller 58, and a spring 59 is connected to the block and a pin 60 which extends outwardly from the member 55. Said spring tends normally to throw the block or swinging member 52 downwardly and to carry the roller 58 thereon into operative relation with a cam secured upon an arm, which latter, when rocked, coöperates with the stamp-protruding mechanism, as will be hereinafter set forth.

Figure 1:
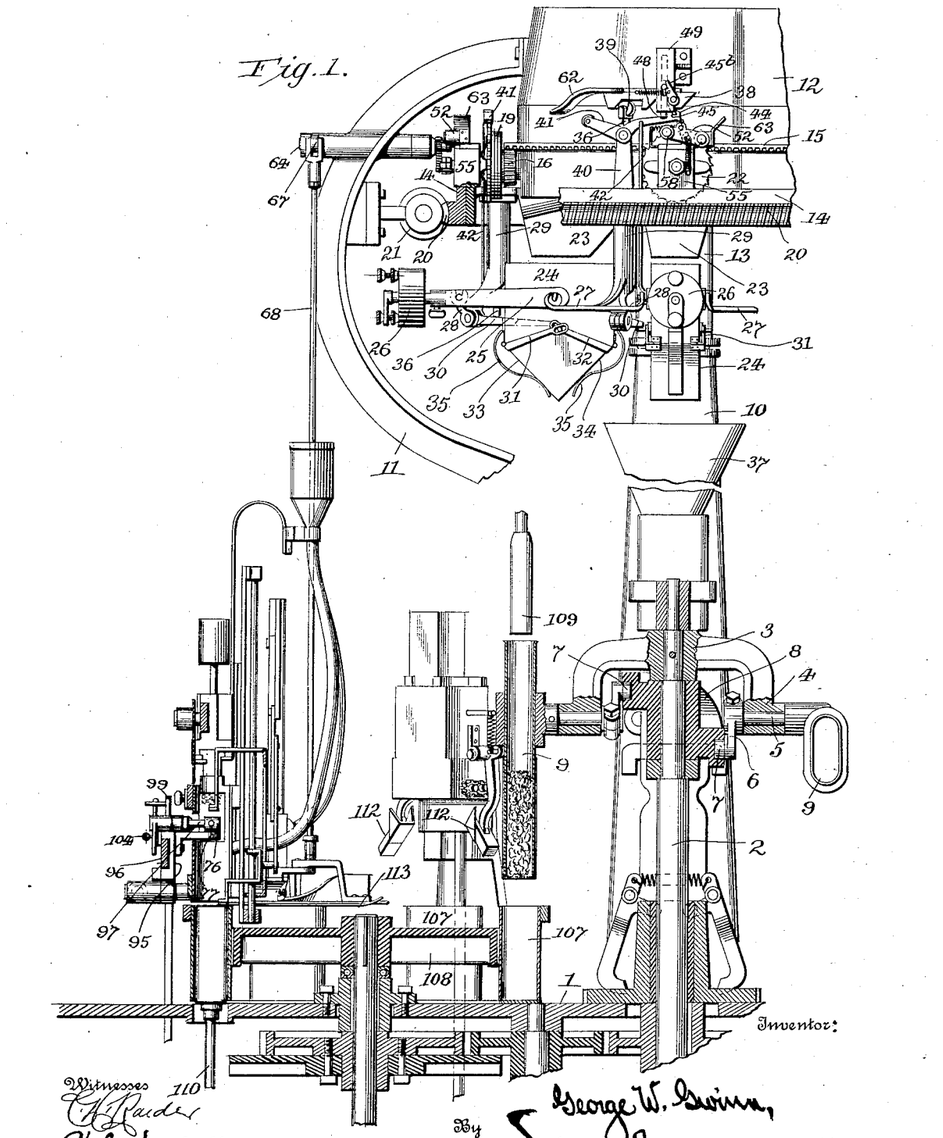
Figure 1 represents a vertical sectional elevation of a portion of a machine of the type set forth in the application referred to above.

In order to rock the lever 41, or in other words, to withdraw the detent 43 from contact with the wheel 22, the lever 41 is provided at one end with a roller 61, which as the parts are rotated, contacts with a cam 62, Fig. 1, secured upon the hopper 12, or other fixed portion of the machine. When said lever is not depressed, by reason of the failure to feed the proper amount of material to the scale-pan, it will, as above set forth, function with the latch member 45 and permit the plunger 48 to descend, in order that it in turn may function with the latch 51 and release the swinging block or member 52. When said plunger 48 is depressed, having released the latch 51, which latter is moved by said plunger by reason of the continued rotation of the casting or member 14, it is necessary to again elevate and reset the plunger in order that it may function with the next succeeding lever 41 of the weighing mechanism.

Figure 8:
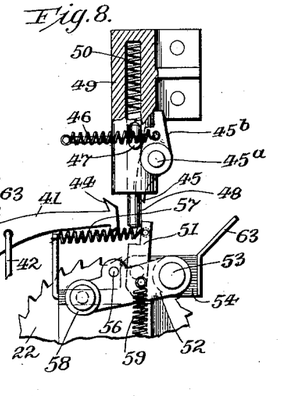
Fig. 8 a like view showing the parts in that position which they occupy when the stamp-presenter is thrown out of action.

In order to effect the elevation and the resetting of the latch arm 45, a beveled plate or inclined member 63 is secured to the extension 54, said inclined plate contacting with the rounded under face of the plunger 48 and moving the same from the position shown in Fig. 8 to that shown in the other figures. Immediately the pin 47, carried by the plunger, passes over the notched portion of the upper end of the latch member 45$^b$ the spring 46 will throw said member beneath the pin and hold the plunger elevated until such time as the tooth or detent 44 of the lever 41 shall again come into contact with the latch member and swing the same to release the pin and its plunger. It will thus be seen that the one or the other of the detents 43, 44 will be thrown into operative relation with its respective mechanism; that is to say, the detent 43 will lock the feed-roll against further operation provided a sufficient amount of material has been fed to the scale-pan, and this will occur prior to the parts reaching the position shown in Fig. 5, or the detent 44 will come into contact with the latch member 45 and release the same; this for the reason that the scale-pan has not received a sufficient charge and the lever 41 has not been depressed through the rod 42 by the descent of the scale-pan. The parts are so proportioned and timed that, as just noted, the scale-pan will receive its full charge (if the parts are working properly) before the pan and the lever 41 reach the point where the casting or bracket 49 is located.

Figure 2:
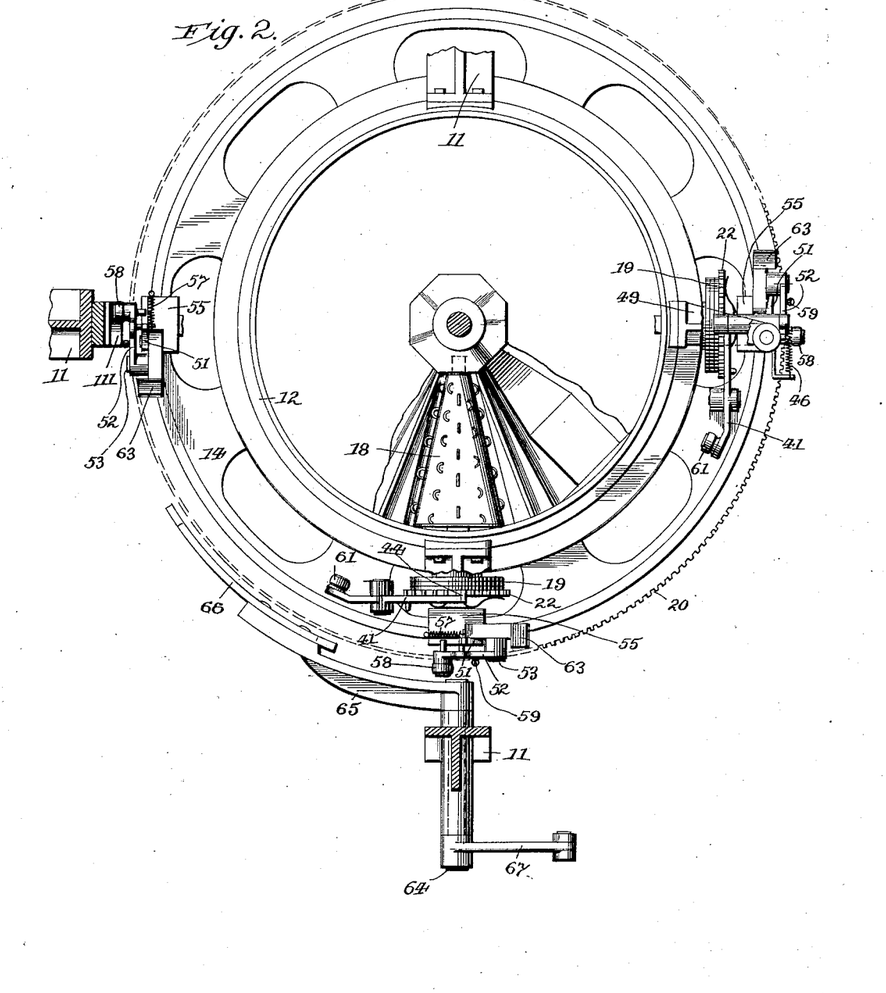
Fig. 2 a top plan view of the hopper, certain portions of the weighing mechanism and supporting brackets being broken away.
Figure 3:
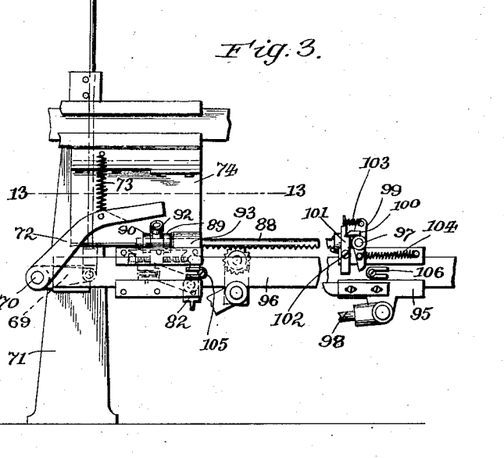
Fig. 3 a side elevation of the feed hopper, the mechanism for driving the feed rolls, and the stamp-presenting mechanism.
Figure 4:
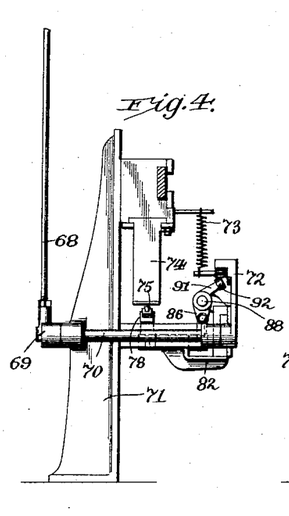
Fig. 4 an end elevation of the stamp-presenting mechanism.
Figure 9:
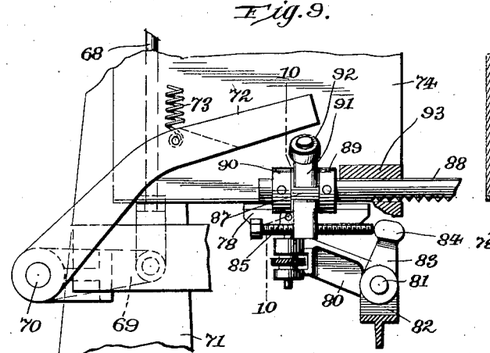
Fig. 9 a side elevation of a portion of the stamp-presenting mechanism, and the lever which coöperates therewith to throw said mechanism into inoperative position.
Figure 10:
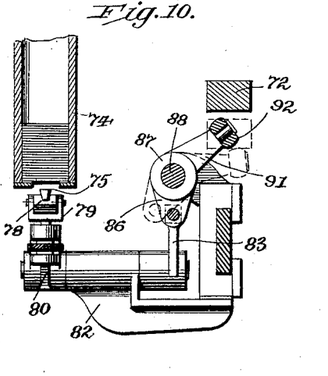
Fig. 10 a vertical sectional view, on the line 10—10 of Fig. 9.
Figure 11:
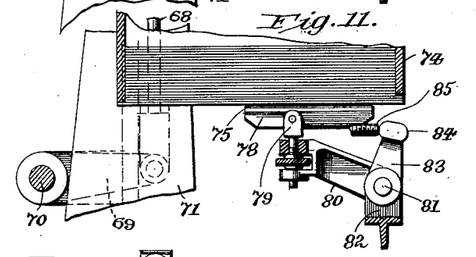
Fig. 11 a vertical sectional view, taken through the lower portion of the stamp-box and showing the stamp-protruding device.

Pivotally mounted in one of the brackets or supporting arms 11 (see Fig. 2) is a shaft 64, secured to the inner end of which is an arm 65, which in turn carries a fixed cam 66 adapted, when the swinging block or member 52 is depressed, to coöperate with the roller 58 thereon; or in other words, the roller 58 passes under said cam and serves to elevate the same, thereby rocking the shaft 64. To the outer end of said shaft 64 is secured an arm 67, to which in turn is attached a rod 68 extending downwardly and being connected to an arm 69 secured to a rock-shaft 70 which latter in turn is mounted in suitable bearings carried by a supporting post or column 71. To the opposite end of the shaft 70 is secured an arm 72, of the form best shown in Figs. 3 and 9, said arm being drawn upwardly by a spring 73 which is secured thereto and to a fixed portion of the machine. The upward movement of the arm will, through the connections before described, swing the arm 65 downwardly and consequently depress the cam 66. The arm 72 is designed to throw the stamp-protruding mechanism out of operation and to prevent the withdrawal of a stamp from the stamp-box when the package to which the stamp is to be applied has not received a full charge. Any suitable stamp-presenting mechanism may be employed, that illustrated being substantially the same as that shown in my copending application Serial No. 506,579 above mentioned.

Figure 12:
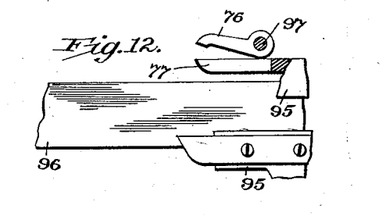
Fig. 12 a sectional elevation of the stamp-grasping jaws and their supporting slide.
Figure 13:
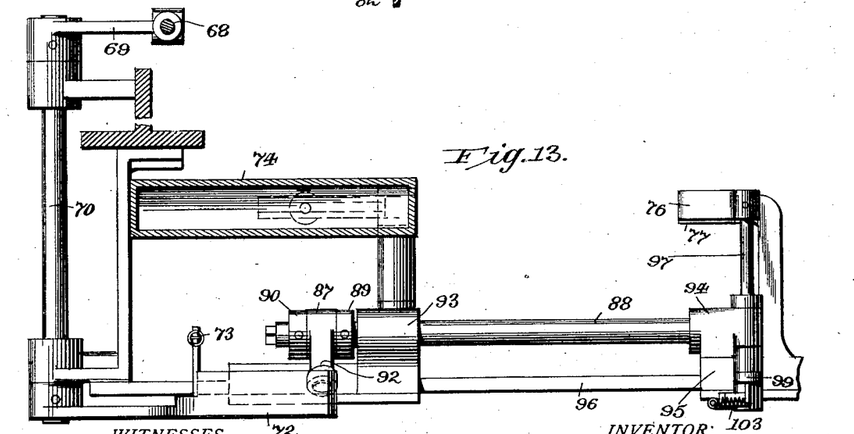
Fig. 13 a horizontal sectional view, taken on the line 13—13 of Fig. 3, the parts being shown upon an enlarged scale.

The stamp-holding box 74 (Figs. 9, 10, 11 and 13) is provided with an opening in the lower side thereof into which may project a shoe 75, preferably of rubber, to engage the lowermost stamp and protrude the same so that it may be grasped by the jaws 76, 77 (Figs. 12 and 13) when said jaws are brought over to the left, in position to grasp the protruding end of the stamp. The shoe 75 is carried by a block 78 which is pivotally mounted in the upper end of a yoke-shaped member 79, said member in turn being adjustably supported in the outer end of an arm 80 which is secured to a rocker-shaft 81 mounted in a bracket 82, the shaft at its opposite end carrying a second arm 83 provided with a head 84 adapted to coact with a bunter-screw 85. Said screw is mounted in an outwardly-projecting lug 86 formed upon a sleeve 87, which sleeve is secured upon a rod 88, the sleeve being free to oscillate upon the rod but held from endwise movement thereon by collars 89, 90. The sleeve 87 is provided with a laterally-projecting arm 91, which arm at its outer end carries a roller 92 that underlies the arm or lever 72, and under certain conditions coacts therewith. The rod 88 passes through and is guided by a tubular member or hollow projection 93, the opposite end of the rod being secured to a block 94 carried by a slide 95, which slide is supported upon a guide or way 96. The slide 95 carries the jaw 77 hereinbefore referred to, and a rocker shaft 97 to which the movable jaw 76 is secured. Reciprocatory motion is imparted to the slide through a rod 98, which is actuated from the driving mechanism of the machine. The shaft 97 carries a rocker-arm 99 provided with a latch 100 adapted to coact with a swinging bar 101, fulcrumed at 102 upon the slide. A spring 103 normally draws the latch 100 into engagement with a shoulder formed upon the swinging bar 101, and a second spring 104, secured to the lower end of the rocker-arm 99 and the slide, serves to draw the lower end of said rocker-arm to the right and consequently rock the shaft 97 and draw the upper jaw 76 down into contact with the lower jaw 77. The swinging bar 101 is released when the parts are moved to the left (when the protruded stamp has passed between the open jaws) by an adjustable plate 105 secured to the guide or way 96. The jaws are again separated when the parts have moved to the extreme right, as in Fig. 3, the lower end of the rocker-arm 99 at such time coming into contact with a fixed stop 106 which swings said rocker-arm and permits the spring 103 to swing the bar 101 so as to carry the shoulder thereon beneath the latch 100.

It is conceivable that, in so far as the generic invention is concerned, any form of stamp-presenting mechanism may be employed in conjunction with the weighing mechanism.

When the package has received its charge, the shaft 2 is lowered and the bag and bag-holder with the contained charge are lowered into one of the bag-forms 107, Fig. 1, a plurality of said forms being carried by a turret 108 to which from time to time a step-by-step motion is imparted through suitable mechanism. After the package has been deposited in one of the forms and the holder and plunger 109 withdrawn therefrom, the turret is rotated and the upstanding ends of the bag are folded by the folding wings 112 and fixed folding plates 113, Fig. 1, or by any other suitable folding mechanism and thereafter, if desired, the folded ends are secured by paste or the like in such closed position. The closed package ultimately comes into alinement with a plunger 110 which moves it upwardly and out of the form against the stamp which has been previously positioned, and thence upward into operative relation with the stamp-applying device.

The construction shown in Fig. 1 for securing the stamp in position is the same as that disclosed in my copending application, Serial No. 506,579, filed on the 8th day of July, 1909, and therein specifically claimed.

The operation of the mechanism is as follows: Assuming that the scales are working properly and the feed rolls are discharging the requisite quantity of material into the pans, the lever 41 of the filled pan will be drawn down by the rod 42 prior to said lever coming into alinement with the latch member 45. The tooth or detent 43 will then engage the toothed wheel 22 and further feeding motion of the roll 18 will be prevented. The pan will be discharged and the material will pass down into the bag upon the bag-holder, then immediately below the funnel. After certain operations, which form no part of the present invention, the bag will be deposited in a bag-form and will ultimately reach a position above the plunger 110. Prior to its reaching this point, the stamp-releasing mechanism will come into action and a stamp will be placed in line with the upper end of the package with which it will come into contact when the package is pushed upwardly. If, however, sufficient material is not fed to any particular scale-pan, the lever 41 will not be moved downwardly, and as a consequence the detent 44 will engage the latch which holds the plunger 48 in its elevated position and release said plunger. Upon the further rotation of the member 14, the downwardly-projecting plunger will come into contact with the latch 51, withdrawing the same from beneath the pin 56 and permitting the swinging block or member 52 to be swung downwardly through the action of the spring 59. This will bring the roller 58 into a position where it will ultimately pass beneath the cam 66, thereby rocking the shaft 64, depressing the arm 67 and the rod 68, rocking shaft 70, and throwing the arm 72 downwardly into the dotted line position in Fig. 10. As said arm 72 moves down it will contact with the roller 92 and swing the lug 86 which carries the bunter-screw out of alinement with the head 84 of the arm 83, bringing the parts into the dotted line position shown in Fig. 10. A movement of the rod 88 to the right will not cause the stamp-protruding device to function by reason of the fact that the bunter-screw passes to one side of the head 84 and the stamp-protruding device remains in its inoperative position, or that shown in Fig. 10. The parts are arranged so that this operation takes place when the light-weight package is about to be brought over the push-member or plunger 110, or in other words, when said light-weight package is one step away from the position where it would be brought into alinement with the stamp. When the roller 58 has passed from beneath the cam 66, the parts will assume the positions shown in Fig. 3, the spring 73 serving to elevate the arm 72 and its allied parts. The sleeve 87 and its attached parts will also come to normal position by reason of the fact that the bunter-screw overbalances the arm 91 and its attached roller. The parts will then be in position to protrude a stamp so that the jaws may grasp the same the next time they are moved to the left. In order to reset the block 52 and bring its pin 56 into engagement with the latch 51, after the roller 58 passes off of the cam 66, there is secured to one of the brackets 11 a cam 111 (Figs. 2 and 3), which cam engages the roller and swings the block upwardly until the spring 57 can throw the latch 51 to the left to engage the pin 56.

While I have specifically referred to a stamp-presenting mechanism, it is to be understood that the mechanism may be employed for presenting a strip, band or the like, which is adapted to be drawn across the upper end of a package and secured thereto.

I have not deemed it necessary to describe the mechanism for applying paste to the stamp, as it is withdrawn from the stamp-box or receptacle, as that forms no part of my present invention. A construction is, however, specifically set forth in my application Serial No. 506,579, filed July 8, 1909, which might be advantageously employed.

The term "stamp" as employed in the claims is used in a generic sense, and is intended to include a strip, label or the like.

Having thus described my invention, what I claim is:

1. In a machine for packaging materials, the combination of weighing mechanism; stamp-presenting mechanism; and connections intermediate said weighing mechanism and the stamp-presenting mechanism, whereby when an insufficient charge of material is fed to the weighing mechanism the stamp-presenting mechanism will be thrown out of operation.

2. In a machine for packaging materials, the combination of suitable weighing mechanism; a normally-operative stamp-presenting mechanism; and means for throwing said mechanism out of operation when a short-weight package comes into alinement with the stamp-presenting mechanism.

3. In a machine for packaging materials, the combination of means for weighing the material to be packaged; a stamp-presenting mechanism; and means operatively connected with the weighing means and the stamp-presenting mechanism and serving, when the proper weight of material has been obtained, to arrest the further feeding of the material to the weighing means, and when an insufficient amount has been fed to said means to throw the stamp-presenting mechanism out of operation.

4. In a machine for packaging materials, the combination of a scale-pan; a feed-roll for feeding the material thereto; a stamp-presenting mechanism adapted to present a stamp to the package into which the charge of material is discharged from the scale-pan; means for throwing the stamp-presenting mechanism out of operation; and means operated by the scale-pan for stopping the feed of material to the pan or, when insufficient material is fed to the pan, throwing the stamp-presenting mechanism out of operation.

5. In a machine for packaging materials, the combination of a scale-pan; means for feeding a charge of material thereto; means operated by the descent of the pan for arresting the movement of said feeding means; a stamp-presenting mechanism; and means operated by the feed-arresting means for throwing the stamp-presenting mechanism out of operation when insufficient material has been fed to the scale-pan.

6. In a machine for packaging materials, the combination of a scale-pan; means for feeding material thereto; a stamp-presenting mechanism; a lever; connections intermediate said lever and the scale-pan for normally depressing the lever when the pan has received a full charge; means acted upon by said lever to prevent the further feeding of material to the pan; and means positioned by the lever, when in its raised position, for throwing the stamp-presenting mechanism out of operation.

7. In a machine for packaging materials, the combination of a scale-pan; means for feeding material thereto; a lever operatively connected with the pan and adapted to be drawn down into operation with the feeding means to stop the feed thereof when the pan has received a full charge; a stamp-box; means for protruding stamps therefrom one by one; and means positioned by the lever aforesaid, when the same is not depressed by the pan, for throwing the stamp-protruding means out of operative relation with the stamps.

8. In a machine for packaging materials, the combination of a scale-pan; means for feeding material thereto; a lever; connections intermediate said lever and the pan, serving to depress the lever when the pan has received a full charge and to bring the lever into engagement with the feeding means to arrest the further movement thereof; an actuating block normally held in an inoperative position; means for releasing said block and permitting the same to pass into operative position when the lever is not depressed by reason of failure of the pan to receive a full charge; a stamp-presenting mechanism; and a cam operatively connected to said presenting mechanism and adapted to be acted upon by the actuating block when said block is thrown to its operative position, whereby when the pan receives a short weight the stamp-presenting mechanism will be thrown out of operation.

9. In a machine for packaging materials, the combination of a scale-pan; means for feeding material thereto; a lever; connections intermediate the pan and the lever, whereby when the pan receives a full charge it will be depressed and the lever brought into engagement with the feeding means to arrest the same; an actuating block or member; means for normally holding said block in its elevated, inoperative position; means actuated by the lever when in its elevated position to release said block or actuating member; a stamp-box; a stamp-presenting member working in conjunction with the stamps in said box; a pair of jaws movable toward and from said box and adapted to grasp a protruded stamp and withdraw the same from the box; a rod movable with said jaws; a bunter carried by said rod and normally standing in alinement with the stamp-presenting member; a lever overlying said bunter; a cam; and connections intermediate said cam and the lever, for actuating the latter and moving the same into contact with the bunter and throwing it out of operative relation with the stamp-presenting member, said connections being operated by the cam when the actuating block comes into contact therewith after it is released.

10. In a machine for packaging material, the combination of a scale-pan; means for feeding material thereto; a lever; connections intermediate said lever and the scale-pan for throwing said lever downwardly when the pan has received a full charge and locking the feeding means against further operation; a stamp-presenter; a cam; connections intermediate said cam and the stamp-presenter to throw the same out of operation when the cam is actuated; an actuating block; a latch serving normally to hold said block in its elevated position and out of operative relation with the cam; means carried by the lever for releasing said latch and permitting the block to move downwardly into the path of the cam when the lever is in its elevated position and the pan has not received a full charge; and means for restoring the actuating block to its elevated position.

11. In a machine for packaging materials, the combination of a scale-pan; means for feeding material thereto; a lever; connections intermediate said lever and the pan, whereby the lever will be drawn downwardly into contact with the feeding means to arrest the movement of the same when the pan has received a full charge; a stamp-presenter; a cam; connections intermediate said cam and the stamp-presenter for throwing the latter out of operation when the cam is operated; an actuating block; a latch for normally holding said block in its elevated position; a plunger; a latch for normally holding said plunger in its elevated position; a detent upon the lever adapted to engage the last-mentioned latch when the lever is in its elevated position and to thereby permit the plunger to move into the path of the latch which holds the actuating block in its elevated position; means for restoring the plunger to its elevated position for engagement with its latch; and means for elevating the actuating block after it has passed the cam.

12. In a machine for packaging material, the combination of weighing mechanism; stamp-presenting mechanism and means serving to render said stamp-presenting mechanism operable only when the weighing mechanism fully functions.

13. In a machine for packaging material, the combination of weighing mechanism; means for closing a package after the material has been discharged from the weighing mechanism into said package; and stamp-presenting mechanism operable only when the weighing mechanism has deposited a full charge of material in the package.

14. In a machine for packaging material, the combination of suitable weighing mechanism adapted to deliver a charge of material to a package; means for closing said package; a normally operative stamp-presenting mechanism; and means for throwing said stamp-presenting mechanism out of operation when the weighing mechanism has presented an insufficient charge of material.

In testimony whereof I have signed my name to this specification in the presence of two subscribing witnesses.

GEORGE W. GWINN.

Witnesses:
M. M. WHEDBEE,
CHAS. B. GOLDSBOROUGH.

---

Copies of this patent may be obtained for five cents each, by addressing the "Commissioner of Patents, Washington, D. C."